United States Patent
Ketchel et al.

(10) Patent No.: US 10,759,274 B2
(45) Date of Patent: Sep. 1, 2020

(54) POWER TRANSFER ASSEMBLY WITH HYPOID GEARSET HAVING INTEGRATED PINION AND CV JOINT COUPLING UNIT

(71) Applicant: MAGNA POWERTRAIN OF AMERICA, INC., Troy, MI (US)

(72) Inventors: Bradley Ketchel, Oxford, MI (US); Wade Smith, Mussey, MI (US); Ralph Larson, Olivet, MI (US); Ryan Strand, Rochester Hills, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 161 days.

(21) Appl. No.: 16/073,430

(22) PCT Filed: Feb. 8, 2017

(86) PCT No.: PCT/US2017/016909
§ 371 (c)(1),
(2) Date: Jul. 27, 2018

(87) PCT Pub. No.: WO2017/139310
PCT Pub. Date: Aug. 17, 2017

(65) Prior Publication Data
US 2019/0024772 A1    Jan. 24, 2019

Related U.S. Application Data

(60) Provisional application No. 62/293,611, filed on Feb. 10, 2016.

(51) Int. Cl.
*F16H 48/42* (2012.01)
*B60K 17/22* (2006.01)
(Continued)

(52) U.S. Cl.
CPC .......... *B60K 17/165* (2013.01); *B60K 17/344* (2013.01); *B60K 17/35* (2013.01);
(Continued)

(58) Field of Classification Search
CPC .................................................. F16H 2048/426
See application file for complete search history.

(56) References Cited

U.S. PATENT DOCUMENTS 1,756,335 A * 4/1930 Bijur ...................... B60R 17/00
464/14
5,916,055 A    6/1999 Wormbaecher
(Continued)

FOREIGN PATENT DOCUMENTS

WO    WO2015077679 A2    5/2015
WO    WO-2015120909 A1 *  8/2015 ............. F16D 11/00

OTHER PUBLICATIONS

International Search Report and Written Opinion dated Jul. 11, 2017 in International Application No. PCT/US2017/016909.

*Primary Examiner* — Tisha D Lewis
(74) *Attorney, Agent, or Firm* — Dickinson Wright PLLC

(57) ABSTRACT

An integrated pinion/bearing/coupling (PBC) assembly for use with a hypoid gearset in power transfer assemblies of motor vehicles having mounting features and venting features. The integrated PBC assembly includes a hollow pinion unit made of steel and including a pinion shaft segment and a pinion gear segment, and a coupling unit having a hub segment made of aluminum. A brazing sleeve is used to braze the aluminum hub segment of the coupling unit to the steel pinion shaft segment of the pinion unit. The PBC assembly can further include a constant velocity joint (CVJ) unit connected to, or formed as part of, the coupling unit.

19 Claims, 13 Drawing Sheets

(51) Int. Cl.
*B60K 17/24* (2006.01)
*B60K 17/16* (2006.01)
*B60K 17/344* (2006.01)
*B60K 17/35* (2006.01)
*F16H 1/14* (2006.01)
*F16H 48/40* (2012.01)
*F16H 57/021* (2012.01)
*F16H 48/08* (2006.01)

(52) U.S. Cl.
CPC ............ *F16H 1/145* (2013.01); *F16H 48/40* (2013.01); *F16H 57/021* (2013.01); *F16H 48/08* (2013.01); *F16H 48/42* (2013.01)

(56) References Cited

U.S. PATENT DOCUMENTS

| | | | | |
|---|---|---|---|---|
| 7,051,619 | B1* | 5/2006 | Morgillo | B60K 17/16 |
| | | | | 180/344 |
| 7,497,801 | B2* | 3/2009 | Kakinami | F16D 3/2237 |
| | | | | 464/145 |
| 9,790,996 | B2* | 10/2017 | Metzger | F16D 1/116 |
| 10,047,801 | B2* | 8/2018 | Ketchel | B60K 17/22 |
| 2002/0183156 | A1 | 12/2002 | Gradu et al. | |
| 2012/0285276 | A1 | 11/2012 | Niimura | |
| 2016/0333954 | A1* | 11/2016 | Lindberg | F16D 65/186 |

* cited by examiner

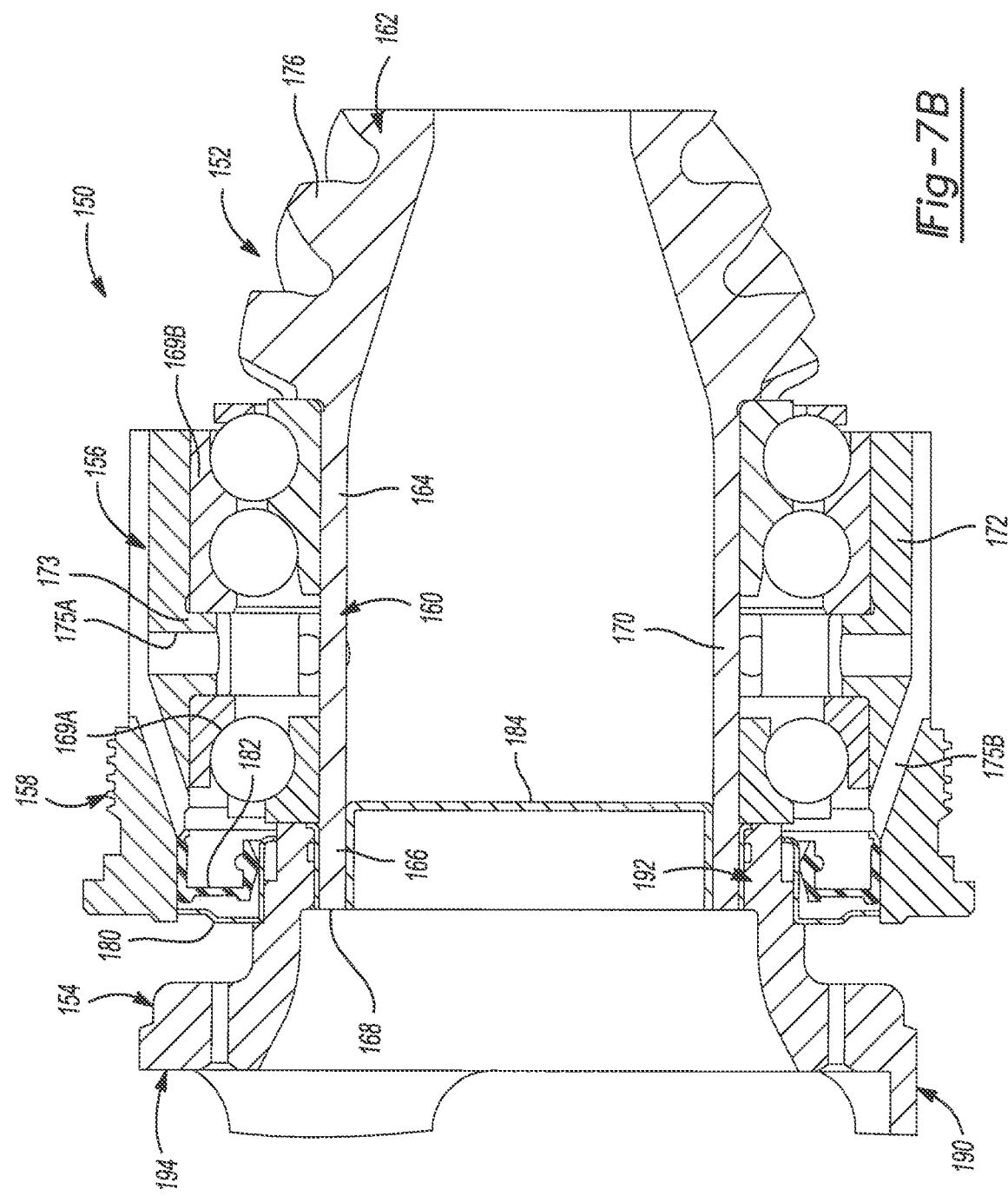

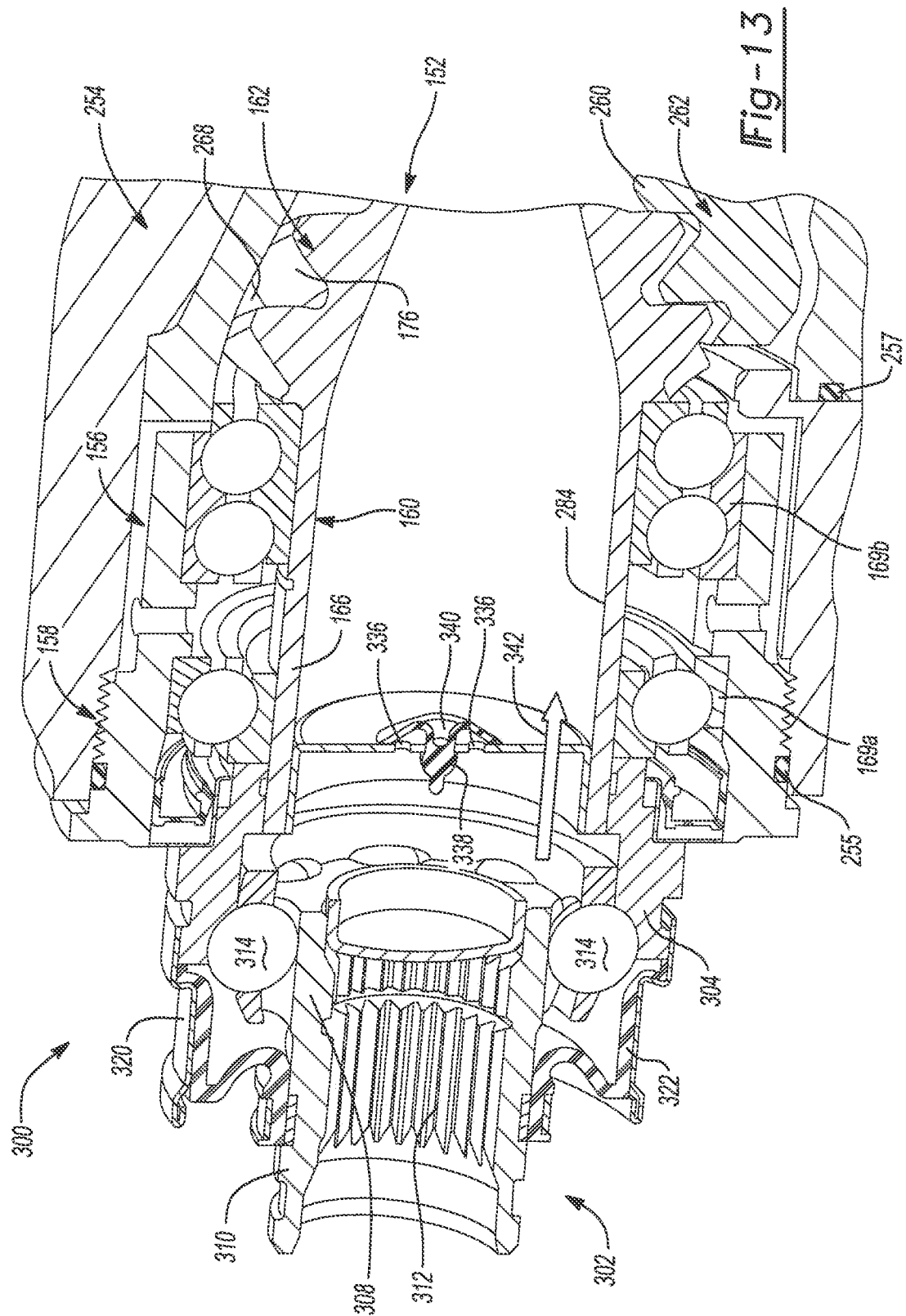

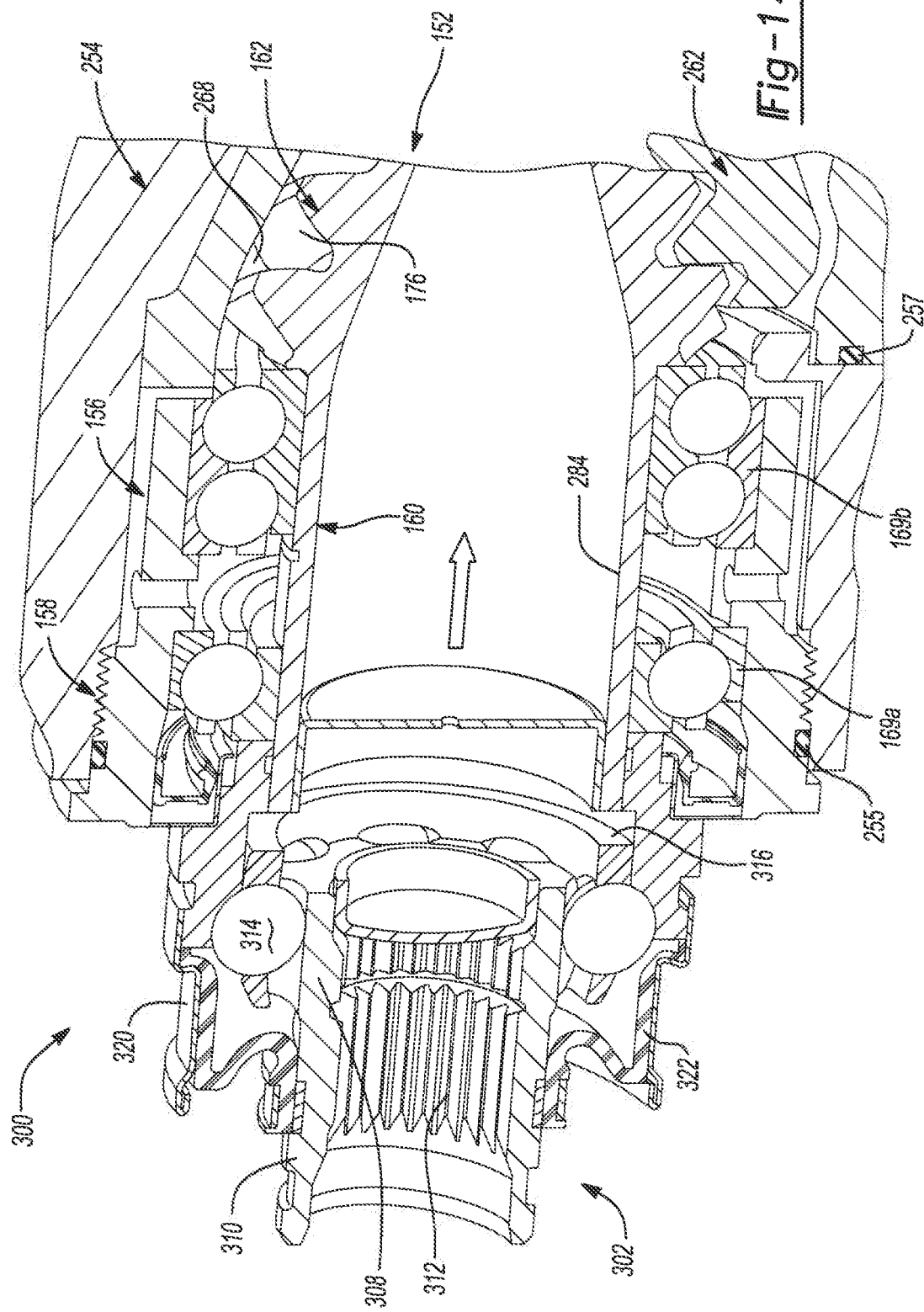

POWER TRANSFER ASSEMBLY WITH HYPOID GEARSET HAVING INTEGRATED PINION AND CV JOINT COUPLING UNIT

CROSS-REFERENCE TO RELATED APPLICATIONS

This application is a National Stage of International Application No. PCT/US2017/016909 filed Feb. 8, 2017, which claims the benefit and priority of U.S. Provisional Application No. 62/293,611 filed Feb. 10, 2016. The entire disclosures of each of the above applications are incorporated herein by reference.

FIELD

The present disclosure relates generally to power transfer systems configured to control the distribution of drive torque from a powertrain to front and rear drivelines of four-wheel drive (4WD) and all-wheel drive (AWD) motor vehicles. More specifically, the present disclosure is directed to hypoid gearsets of the type used in drive axle assemblies having an integrated pinion and CV joint coupling unit.

BACKGROUND

This section provides background information related to the present disclosure which is not necessarily prior art.

In view of increased consumer demand for four-wheel drive (4WD) and all-wheel drive (AWD) motor vehicles, a large number of power transfer systems are currently utilized in vehicular applications for selectively and/or automatically transmitting rotary power (i.e., drive torque) from the powertrain to all four wheels. In most power transfer systems, a power transfer assembly is used to deliver drive torque from the powertrain to one or both of the primary and secondary drivelines. The power transfer assembly is typically equipped with a torque transfer coupling that can be selectively actuated to shift operation of the power transfer system from a two-wheel drive mode into a four-wheel drive mode. In the two-wheel drive mode, drive torque is only transmitted to the primary driveline while drive torque can be transmitted to both of the primary and secondary drivelines when the vehicle is operating in the four-wheel drive mode.

In most 4WD vehicles, the power transfer assembly is a transfer case arranged to normally transmit drive torque to the rear driveline and selectively/automatically transfer drive torque through the torque transfer coupling to the front driveline. In contrast, in most AWD vehicles, the power transfer assembly is a power take-off unit (PTU) arranged to normally permit drive torque to be transmitted to the front driveline and to selectively/automatically transfer drive torque through the torque transfer coupling to the rear driveline.

Many power transfer assemblies are equipped with an adaptively-controlled torque transfer coupling to provide an "on-demand" power transfer system operable for automatically biasing the torque distribution ratio between the primary and secondary drivelines, without any input or action on the part of the vehicle operator, when traction is lost at the primary wheels. Modernly, such adaptively-controlled torque transfer couplings are equipped with a multi-plate clutch assembly and a power-operated clutch actuator that is interactively associated with an electronic traction control system having a controller unit and a plurality of vehicle sensors. During normal operation, the clutch assembly is maintained in a released condition so as to transmit drive torque only to the primary wheels and establish the two-wheel drive mode. However, upon detection of conditions indicative of a low traction condition, the power-operated clutch actuator is actuated to frictionally engage the clutch assembly and deliver a portion of the total drive torque to the secondary wheels, thereby establishing the four-wheel drive mode.

In virtually all power transfer systems of the types noted above, the secondary driveline is configured to include a propshaft, a drive axle assembly, and one or more constant velocity universal joints. Typically, the opposite ends of the propshaft are drivingly interconnected via the constant velocity universal joints to a rotary output of the torque transfer coupling and a rotary input to the drive axle assembly. In most instances, this rotary input is a hypoid gearset used to transmit drive torque from the propshaft to a differential gear mechanism associated with the drive axle assembly. The differential gear mechanism may include a differential carrier rotatably supported in an axle housing and which drives at least one pair of bevel pinions which, in turn, are commonly meshed with first and second output bevel gears. The first and second output bevel gears of the differential gear mechanism are drivingly connected to corresponding first and second axleshafts which, in turn, drive the secondary wheels. The hypoid gearset includes a pinion gear meshed with a ring gear. The pinion gear is typically formed integrally with, or fixed to, a solid pinion shaft that is also rotatably support by the axle housing. The pinion shaft is usually connected via one of the constant velocity universal joints to the propshaft while the ring gear is usually fixed for rotation with the differential carrier of the differential gear mechanism. Due to the axial thrust loads transmitted through the hypoid gearset, it is common to utilize at least two laterally-spaced tapered bearing assemblies to support the pinion shaft for rotation relative to the axle housing.

Many constant velocity (CV) joints are sealed in order to retain lubricant, such as grease, inside the joint while keeping contaminants and foreign matter, such as dirt and water, out of the joint. To achieve this protection, the CV joint is typically enclosed at the open end of its outer race by a sealing boot made of rubber or urethane. The opposite end of the outer race is sometimes formed by an enclosed dome or grease cap. Such sealing is necessary since once the inner chamber of the CV joint is partially-filled with the lubricant, it is generally lubricated for life. It is often necessary to vent the CV joint in order to minimize air pressure fluctuations which result from expansion and contraction of air within the joint during operation. This is especially true, for example, in tripod-type, plunging and monoblock types of joints.

Plunging tripod CV joints are widely used in 4WD and AWD vehicles and provide a plunging end motion feature which allows the interconnected rotary components to change length during operation without the use of splines. Plunging "cross-groove" types of CV joints are also commonly used to interconnect the pinion shaft of the hypoid gearset in the drive axle assembly to the propshaft and include balls located in the circumferentially-spaced straight or helical grooves formed in the inner and outer races. Typically, CVJ's are vented by placing a vent system in the housing, such as a vent hole, to allow passage of air into and out of the joint, as needed, to prevent internal pressure buildups. Unfortunately, grease may eventually block the air passage through the vent hole which could lead to reduced service life of the lubricated for life joints.

While such conventional drive axle assemblies and pinion shaft support arrangements are adequate for their intended purpose, a need still exists to advance the technology and structure of such products to provide enhanced configurations that provide improved efficiency, reduced weight, and reduced packaging requirements.

SUMMARY

This section provides a general summary of the disclosure and should not be interpreted as a complete and comprehensive listing of all of the objects, aspects, features and advantages associated with the present disclosure.

It is an object of the present disclosure to provide an arrangement and process for coupling an aluminum flange of a joint coupling to a hollow steel pinion shaft using an intermediary metal. The aluminum flange can be coupled to a tubular portion of the steel pinion shaft via various methods including, but not limited to, brazing, welding, staking, splines and the like.

It is another object of the present disclosure to provide venting solutions for venting axles, differentials and/or constant velocity joints.

It is another object of the present disclosure to provide a pinion cartridge design which can be threaded into a housing to attach and set backlash between the pinion gear and the ring gear of a hypoid gearset in a drive axle assembly or a power take-off unit.

It is yet another object of the present disclosure to provide a hollow pinion gear/pinion shaft arrangement for a hypoid gearset in a drive axle assembly or a power take-off unit.

It is a still further object of the present disclosure to provide an integrated assembly adapted for installation in the housing and which includes a hollow steel pinion shaft attached to an aluminum coupling member and which is supported by a bearing arrangement within the housing. A related object further integrates a constant velocity universal joint into the assembly.

It is another object of the present disclosure to provide a power transfer assembly equipped with a hypoid gearset having an integrated pinion, bearing and coupler arrangement. The coupler can be configured as a flanged bolt-up type or an integrated constant velocity universal joint.

These and other objects of the present disclosure are provided by an integrated pinion/bearing/coupling (PBC) assembly for use in a power transfer assembly to transfer drive torque from a rotary input to a rotary output so as to transmit drive torque from a powertrain to a pair of ground-engaging wheels. The PBC assembly includes a pinion unit, a bearing unit, and a coupler unit. The pinion unit is a hollow steel component having a pinion shaft segment and a pinion gear segment which is adapted to be meshed with a ring gear of a hypoid gearset. The coupler unit is an aluminum component having a hub segment configured to surround an end portion of the pinion shaft segment. The PBC assembly further includes a brazing sleeve made of an intermediary material and which is disposed between the hub segment of the aluminum coupler unit and the hollow pinion shaft segment of the steel pinion unit. A brazing operation is employed to rigidly and fixedly secure the aluminum coupler unit for rotation with the steel pinion unit.

The PBC assembly of the present disclosure is further configured such that the bearing unit includes a pair of laterally-spaced bearing assemblies disposed between the pinion shaft segment of the steel pinion unit and a bearing housing adapted to be secured to a power transmission housing. A lock collar can be integrated into the bearing housing of the bearing unit to permit preload adjustment by varying the axial positioning of the PBC assembly relative to the power transmission housing.

The PBC assembly of the present disclosure is further configured to provide an internal venting arrangement installed within the hollow steel pinion unit.

These and other objects of the present disclosure are also provided by a combined constant velocity joint (CVJ) and PBC assembly, hereinafter referred to as an integrated CVJ/PBC assembly, for use in a power transfer assembly to transfer drive torque from a rotary input to a rotary output so as to transmit drive torque from a powertrain to a pair of ground-engaging wheels. The CVJ/PBC assembly includes a pinion unit, a bearing unit, and a joint unit. The pinion unit includes a hollow steel pinion shaft having a pinion shaft segment and a pinion gear segment which is adapted to mesh with a ring gear to define a hypoid gearset. An outer race component of the joint unit is rigidly secured, directly or via the brazing sleeve, to the hollow pinion shaft segment of the pinion unit. The joint unit further includes an inner race component fixed to, or integrally formed with, a plunging-type coupling sleeve configured to be secured (i.e. splined) to the propshaft. Balls or rolling elements are located between an annular guide groove formed in the outer race component and elongated guide slots formed in the inner race component with a cage supporting the rolling elements.

The PBC assembly of the present disclosure, alone or in combination with the CVJ unit, is well-suited for use in drive axles and power take-off units such that the pinion gear segment of the hollow steel pinion unit meshes with a ring gear to define a hypoid gearset arrangement.

Further areas of applicability will become apparent from the detailed description provided herein. The specific embodiments and examples set forth in this summary are intended for purposes of illustration only and are not intended to limit the scope of the present disclosure.

DRAWINGS

The drawings described herein are only provided to illustrate selected non-limiting embodiments and are not intended to limit the scope of the present disclosure. According to the following:

FIGS. 7A and 7B are sectional views of an integrated pinion/bearing/coupling (PBC) assembly adapted for use with any of the previously-noted power transfer systems and which is constructed in accordance with the teachings of the present disclosure, while

FIGS. 12 and 13 are sectional views of an alternative embodiment of the integrated CVJ/PBC assembly shown in FIG. 11 now equipped with a different venting arrangement; and FIG. 14 is a sectional view of yet another alternative embodiment of the integrated CVJ/PBC assembly equipped with an alternative venting arrangement.

DETAILED DESCRIPTION

Figure 1:
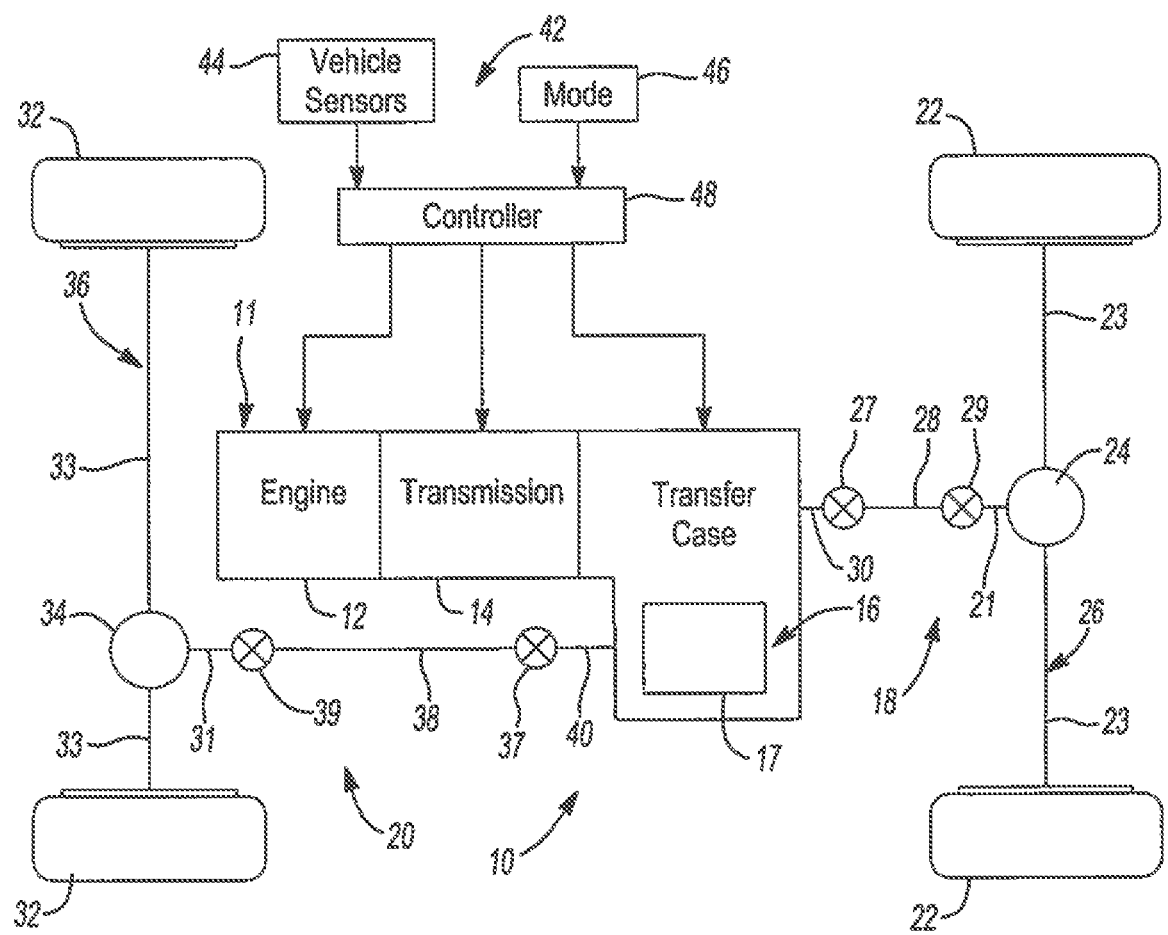
FIG. 1 is a schematic view of a four-wheel drive (4WD) motor vehicle equipped with a power transfer system having one or more products and/or assemblies embodying the teachings of the present disclosure.

Example embodiments will now be described more fully with reference to the accompanying drawings. The example embodiments are provided so that this disclosure will be thorough, and will fully convey the scope of the present disclosure to those who are skilled in the art. In particular, various examples of different power transfer systems for motor vehicles will be described to which products and/or assemblies embodying the teachings of the present disclosure are well-suited for use. To this end, various power transfer assemblies including, without limitations, transfer cases, power take-off units, drive axle assemblies, torque transfer coupling, and differentials are disclosed which can be equipped with a hypoid gearset having an integrated pinion/bearing/coupling (PBC) assembly constructed in accordance with the teachings of the present disclosure. However, numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present, Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context, Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below.

Referring initially to FIG. 1, an example of a four-wheel drive (4WD) power transfer system for a motor vehicle 10 is shown. Motor vehicle 10 includes a powertrain 11 operable for generating and transmitting rotary power (i.e. drive torque) to a first or primary driveline 18 and a second or secondary driveline 20. Powertrain 11 is shown in this non-limiting example to include an internal combustion engine 12 and a transmission 14. Primary driveline 18, hereinafter identified as the rear driveline, includes a pair of ground-engaging rear wheels 22 that are interconnected via a pair of rear axleshafts 23 to a rear differential assembly 24 as part of a rear drive axle assembly 26. Secondary driveline 20, hereinafter identified as the front driveline, includes a pair of ground-engaging front wheels 32 that are interconnected via a pair of front axleshafts 33 to a front differential assembly 36 defining a front drive axle assembly 36.

The power transfer system also includes a power transfer assembly, shown in FIG. 1 as a transfer case 16, configured to receive drive torque from powertrain 11 and transmit this drive torque permanently to rear driveline 18 and selectively/automatically to front driveline 20. Transfer case 16 generally includes a rear output shaft 30, a torque transfer coupling 17, and a front output shaft 40. A first end of a rear propshaft 28, also associated with rear driveline 18, is shown drivingly connected via first joint coupling 27 to rear output shaft 30. A second end of rear propshaft 28 is shown drivingly coupled via a second joint coupling 29 to an input component 21 of rear axle assembly 26. Typically, input component 21 is a pinion shaft driving a pinion gear that is meshed with a ring gear, and which together define a rear hypoid gearset. The ring gear drives rear differential assembly 24. As such, rear propshaft 28 is configured to transmit drive torque from rear output shaft 30 of transfer case 16 to rear axle assembly 26. Similarly, a first end of a front propshaft 38 associated with front driveline 20 is shown drivingly connected via a first joint coupling 37 to front output shaft 40. A second end of front propshaft 28 is shown drivingly connected via a second joint coupling 39 to an input component 31 of front axle assembly 36. Typically, input component 31 is a pinion shaft driving a pinion gear that is meshed with a ring gear, and which together define a front hypoid gearset. The ring gear drives front differential assembly 34. Thus, front propshaft 38 is configured to transmit drive torque from front output shaft 40 of transfer case 16 to front axle assembly 36.

Figure 2:
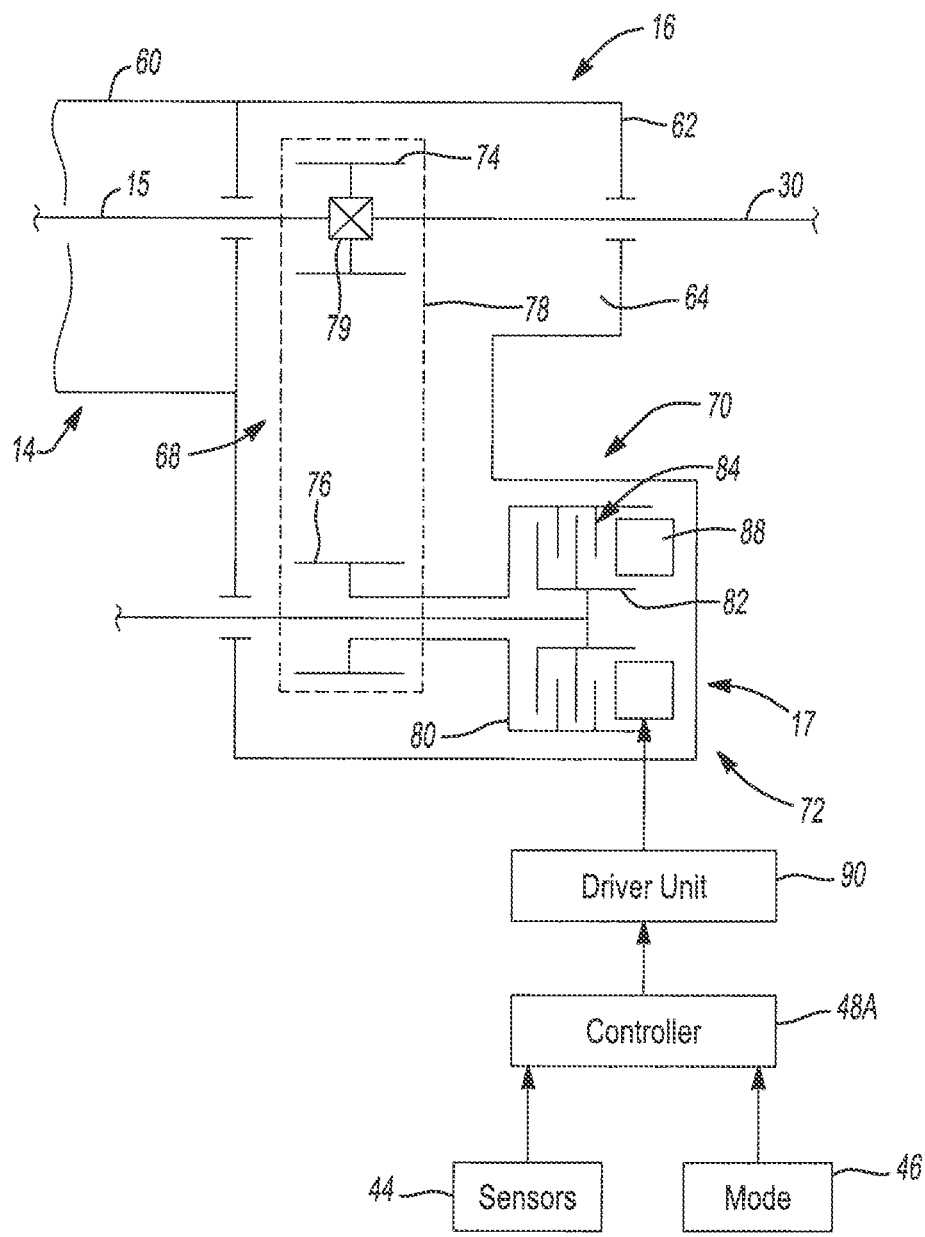
FIG. 2 is a diagrammatical illustration of a power transfer assembly, embodied as a transfer case, associated with the 4WD power transfer system shown in FIG. 1.

Referring now to FIG. 2, a non-limiting example of transfer case 16 will be described. In the arrangement shown, a transmission output shaft 15 extends from a transmission housing 60 into a transfer case housing 62 that is adapted to be secured to transmission housing 60 and which defines an internal chamber 64. Transmission shaft 15 is coupled for common rotation with rear output shaft 30. Transfer case 16 is shown in FIG. 2 to further include a transfer assembly 68 and torque transfer coupling 17 is shown configured to include a clutch assembly 70 and a power-operated clutch actuator 72. Transfer assembly 68 can be configured as a geared drive assembly or as a chain drive assembly. In the particular example disclosed, transfer assembly 68 is a chain drive assembly having a first sprocket 74 drivingly coupled to rear output shaft 30, a second sprocket 76 rotatably supported on front output shaft 40, and a continuous power chain 78 encircling and meshing with both first sprocket 74 and second sprocket 76. A coupling interface 79 is schematically shown for indicating a drive coupling between first sprocket 74 and rear output shaft 30.

Clutch assembly 70 is shown as a multi-plate friction clutch having a first clutch member 80 coupled for rotation with second sprocket 76, a second clutch member 82 coupled for rotation with front output shaft 40, and a multi-plate clutch pack 84 comprised of a plurality of interleaved inner and outer clutch plates. The inner clutch plates are coupled to second clutch member 82 while the outer clutch plates are coupled to first clutch member 80. Power-operated clutch actuator 72 includes an axially moveable apply device 88 capable of applying a compressive clutch engagement force on clutch pack 84, and a powered driver unit 90 operable for controlling the axial position of apply device 88 relative to clutch pack 84. The magnitude of the clutch engagement force exerted on clutch pack 84 is proportional to the amount of drive torque transmitted from rear output shaft 30 through transfer assembly 68 to front output shaft 40. Accordingly, when a predetermined minimum clutch engagement force is applied to clutch pack 84, a minimum amount of drive torque is transmitted to front driveline 20. In contrast, when a predetermined maximum clutch engagement force is applied to clutch pack 84, a maximum amount of drive torque is transmitted to front driveline 20. As such, adaptive control over the front/rear drive torque distribution ratio can be provided by actively controlling operation of transfer case 16 to establish a two-wheel drive (2WD) mode and an on-demand four-wheel drive (4WD) mode. FIG. 2 also illustrates a transfer case controller unit 48A associated with vehicle controller 48 of FIG. 1 that is operable for controlling actuation of powered driver unit 90 in response to signals from sensors 44 and/or mode selector 46 and which, in turn, controls the axial position of apply device 88 relative to clutch pack 84.

Figure 3:
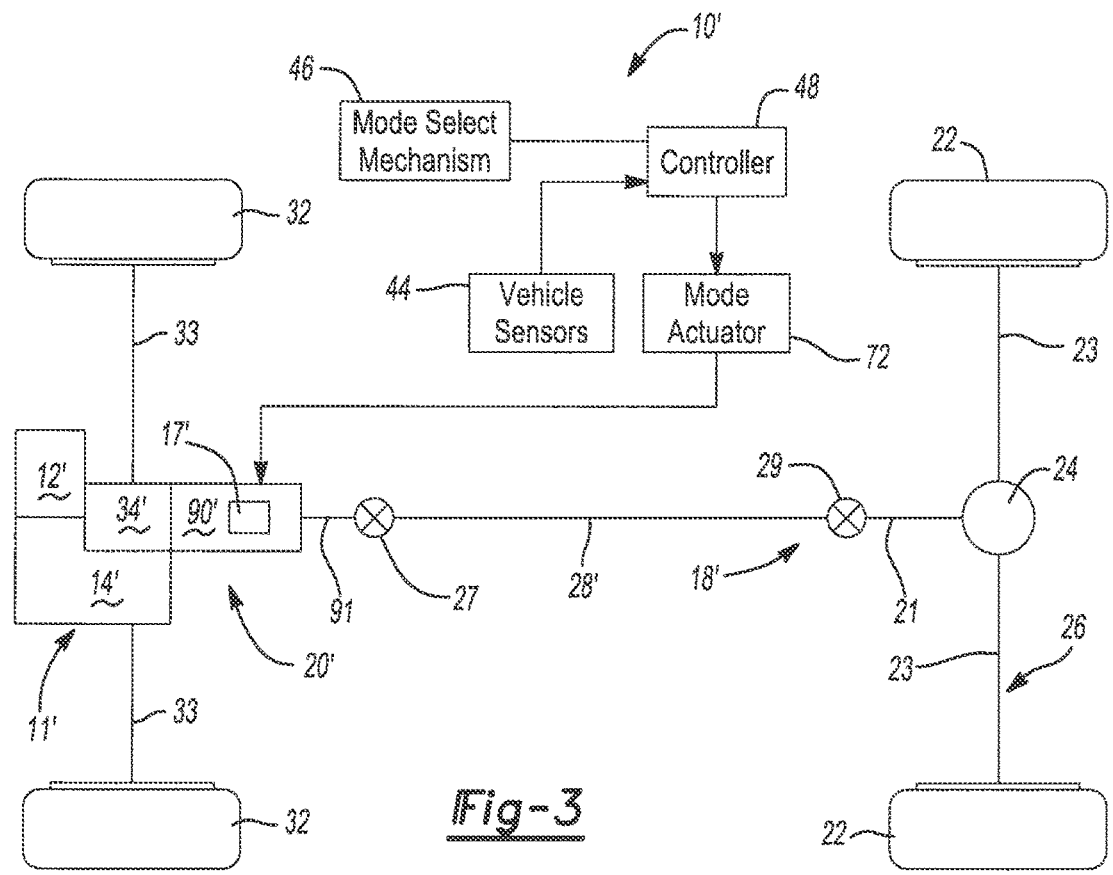
FIG. 3 is schematic view of an all-wheel drive (AWD) motor vehicle equipped with a power transfer system having one or more products and/or assemblies embodying the teachings of the present disclosure.

Referring now to FIG. 3, an example of an all-wheel drive (AWD) power transfer system for a motor vehicle 10' is shown. Motor vehicle 10' includes a powertrain 11' comprised of an engine 12' and a transmission 14'. The primary driveline, in this non-limiting example, is front driveline 20' while the secondary driveline is rear driveline 18'. Drive torque from powertrain 11' is normally transmitted through a front differential assembly 34' to front wheels 32 via front axleshafts 33. As seen, the first end of a rear propshaft 28' is drivingly interconnected via first joint coupling 27 to an output component 91 of a power transfer assembly, hereinafter referred to as power take-off unit 90. Furthermore, the second end of rear propshaft 28' is drivingly connected via second joint coupling 29 to rotary input 21 of rear axle assembly 26.

Figure 4:
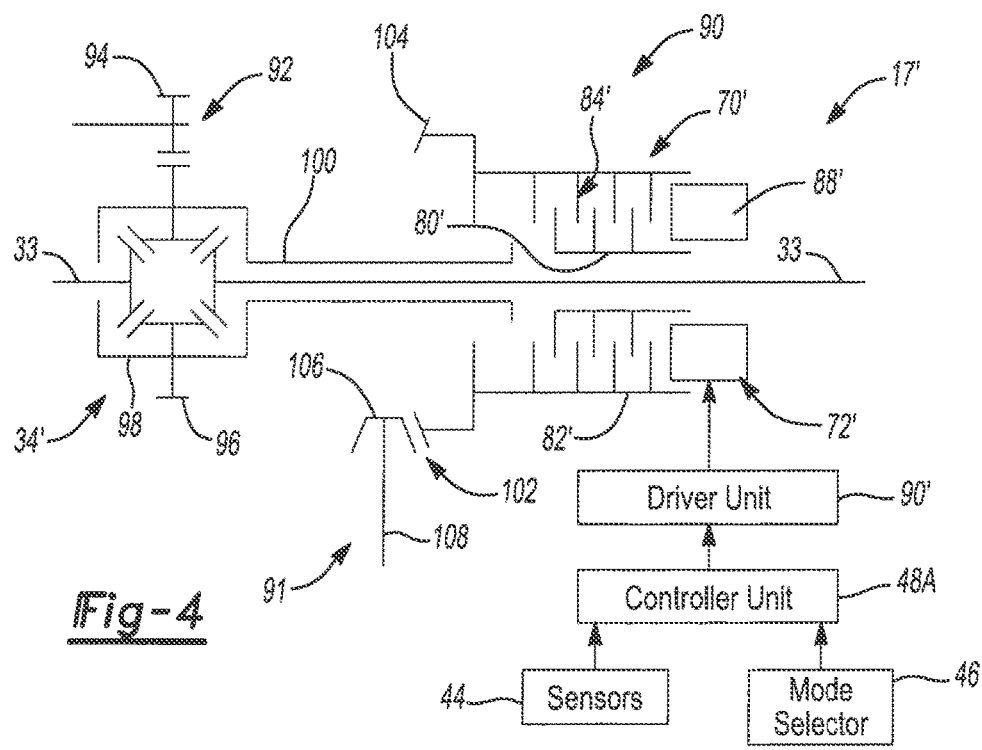
FIG. 4 is a diagrammatical illustration of a power transfer assembly, embodied as a power take-off unit, associated with the AWD power transfer system shown in FIG. 3.

FIG. 4 diagrammatically illustrates a non-limiting example of power take-off unit (PTU) 90. A final drive gearset 92 of transmission 14' includes an output gear 94 driving a ring gear 96 fixed to a differential carrier 98 of front differential assembly 34', PTU 90 includes an input shaft 100 driven by gearset 92 or carrier 98, a hypoid gearset 102, and a torque transfer coupling 17' therebetween. Hypoid gearset 102 includes a crown gear 104 meshed with a pinion gear 106 which, in turn, is drivingly connected to a pinion shaft 108 which acts as output component 91. Torque transfer coupling 17' includes a clutch assembly 70 and a power-operated clutch actuator 72'. Clutch assembly 70' is a multi-plate friction clutch having a first clutch member 80' coupled to input shaft 100, a second clutch member 82' coupled to crown gear 104, and a multi-plate clutch pack 84'. Multi-plate clutch pack 84' includes inner clutch plates coupled to first clutch member 80' which are alternately interleaved with outer clutch plates coupled to second clutch member 82'.

Power-operated clutch actuator 72' includes an axially-moveable apply device 88' capable of applying a compressive clutch engagement force on clutch pack 84', and a powered driver unit 90' operable for controlling the axial position of apply device 88' relative to clutch pack 84'. The magnitude of the clutch engagement force applied to clutch pack 84' is proportional to the amount of drive torque transmitted from input shaft 100 through clutch assembly 70' and hypoid gearset 102 to rear propshaft 28'. Thus, when a minimum clutch engagement force is applied to clutch pack 84', a minimum drive torque is transmitted via hypoid gearset 102 to rear driveline 18'. In contrast, when a maximum clutch engagement force is applied to clutch pack 84', a maximum drive torque is transmitted to rear driveline 18'. As such, active control over the front/rear torque distribution ratio is provided. This allows establishment of the above-noted 2WD and on-demand 4WD modes of operation for vehicle 10'.

Figure 5:
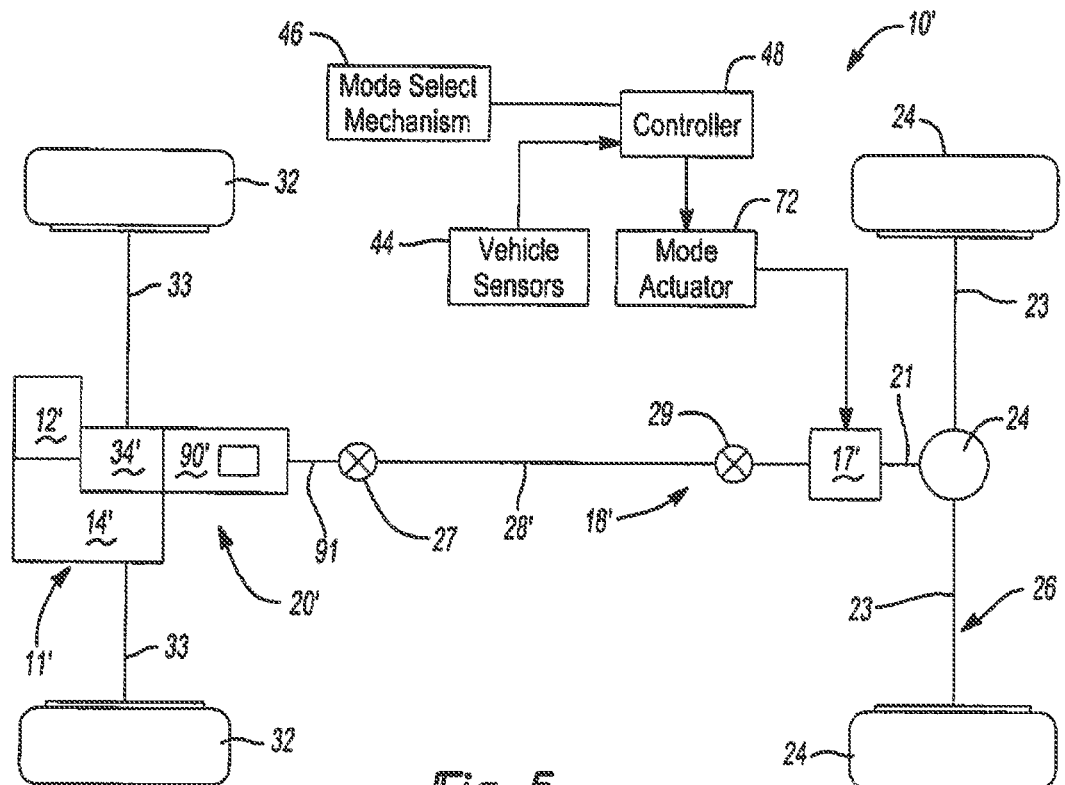
FIG. 5 is a diagrammatical view of an alternative version of the all-wheel drive vehicle shown in FIG. 3 and which is equipped with an AWD power transfer system having one or more products and/or assemblies embodying the teachings of the present disclosure.
Figure 6:
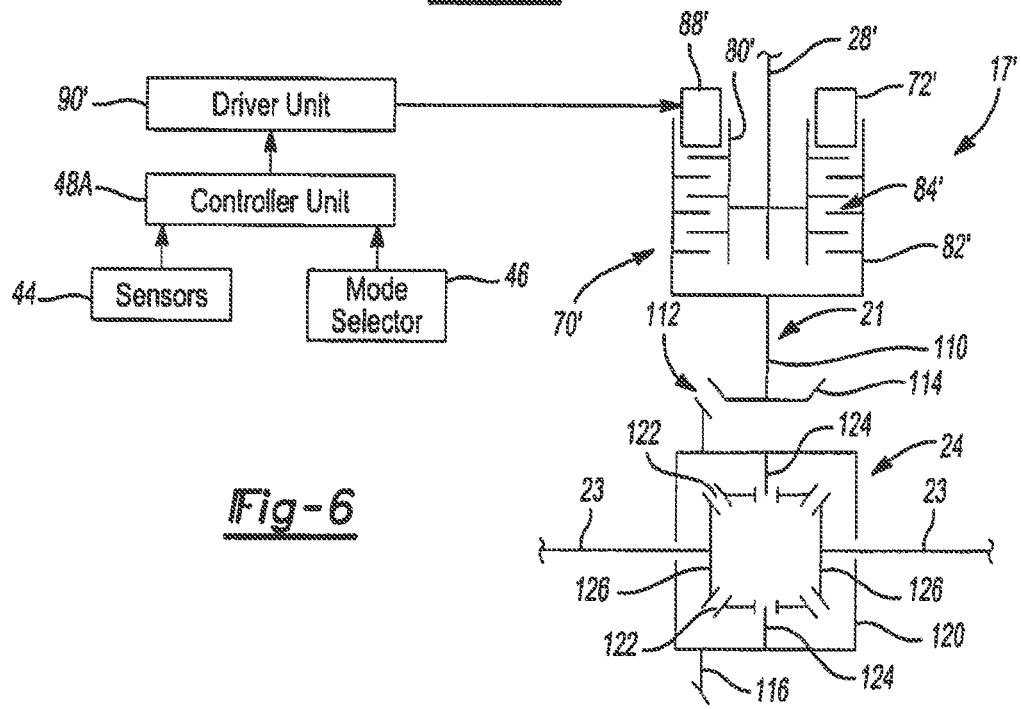
FIG. 6 is a schematic view of a power transfer assembly, embodied as a torque transfer coupling, associated with AWD power transfer system shown in FIG. 5.

Referring now to FIG. 5, a revised version of AWD motor vehicle 10' is now shown with torque transfer coupling 17' removed from PTU 90' and operably disposed between rear propshaft 28' and rotary input 21 to rear axle assembly 26. As such, PTU 90' is configured with input shaft 100 driving crown gear 104 of hypoid gearset 102 such that pinion gear 106 drives rear propshaft 28' via coupling unit 27. As best seen from FIG. 6, rotary input 21 of rear axle assembly 26 is shown to include a pinion shaft 110 and a hypoid gearset 112. Pinion shaft 110 is fixed to second clutch member 82' of clutch assembly 70'. Hypoid gearset 112 includes a pinion gear 114 meshed with a ring gear 116. Pinion gear 114 is fixed to pinion shaft 110 while ring gear 116 is fixed for rotation with a carrier 120 of rear differential assembly 24. Rear differential assembly 24 is shown to include a pair of differential pinions 122 rotatably mounted on crosspins 124 that are fixed to carrier 120. Output gears 126 are meshed with pinions 122 and are drivingly connected to axleshafts 23. Actuation of power-operated clutch actuator 72' functions to control the amount of drive torque transmitted from powertrain 11' through PTU 90' and rear propshaft 28' to hypoid gearset 112 for driving rear axle assembly 26.

The above configurations are clearly illustrated to incorporate a hypoid gearset into one or more products and/or assemblies associated with rear axle assembly 26, front axle assembly 36, torque transfer device 17' and/or PTU 90, 90'. Accordingly the following detailed description of various embodiments of the present disclosure is sufficient to provide one skilled in this art an understanding and appreciation of the structure and function of the following.

Figure 7A:
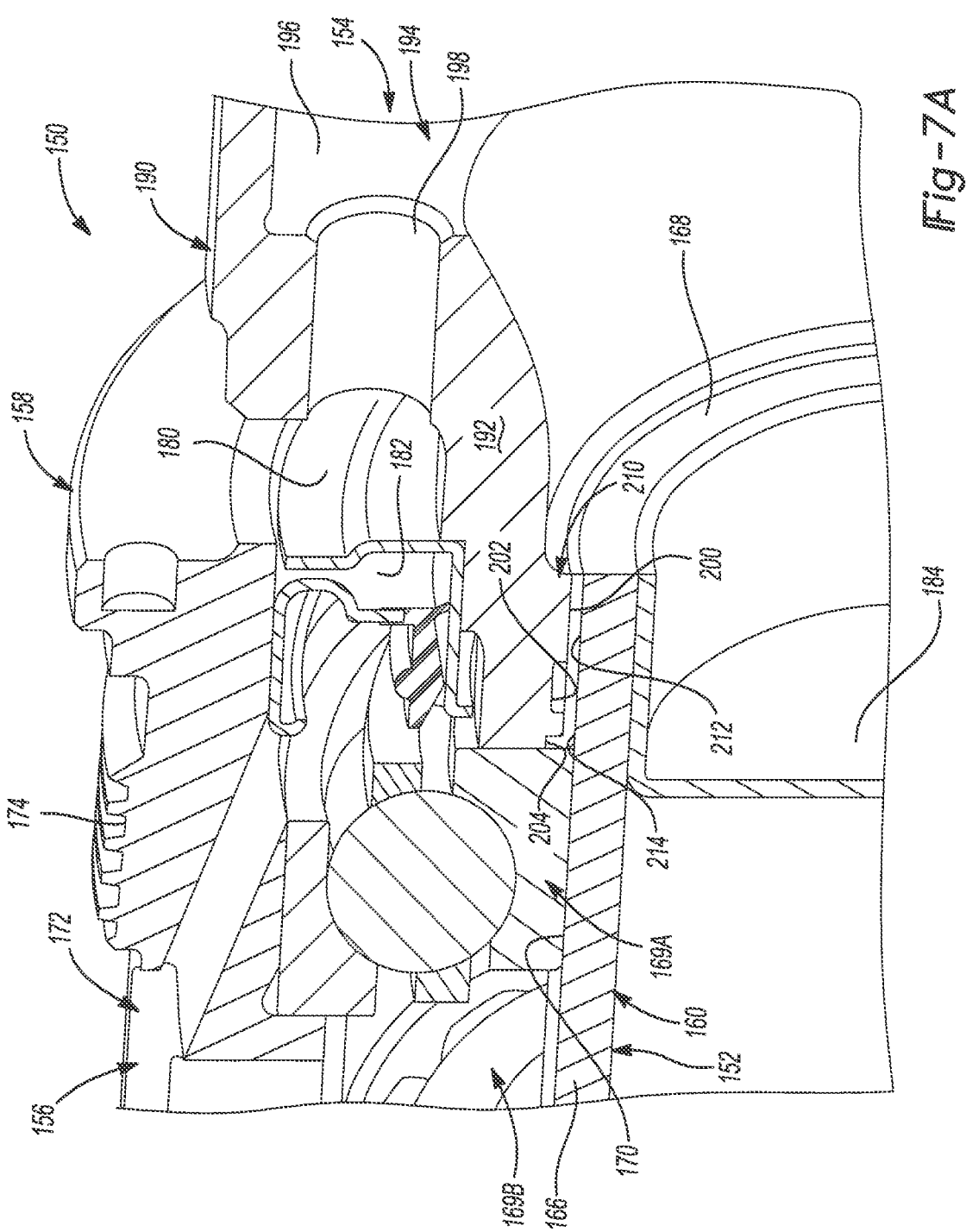
Figure 7C:
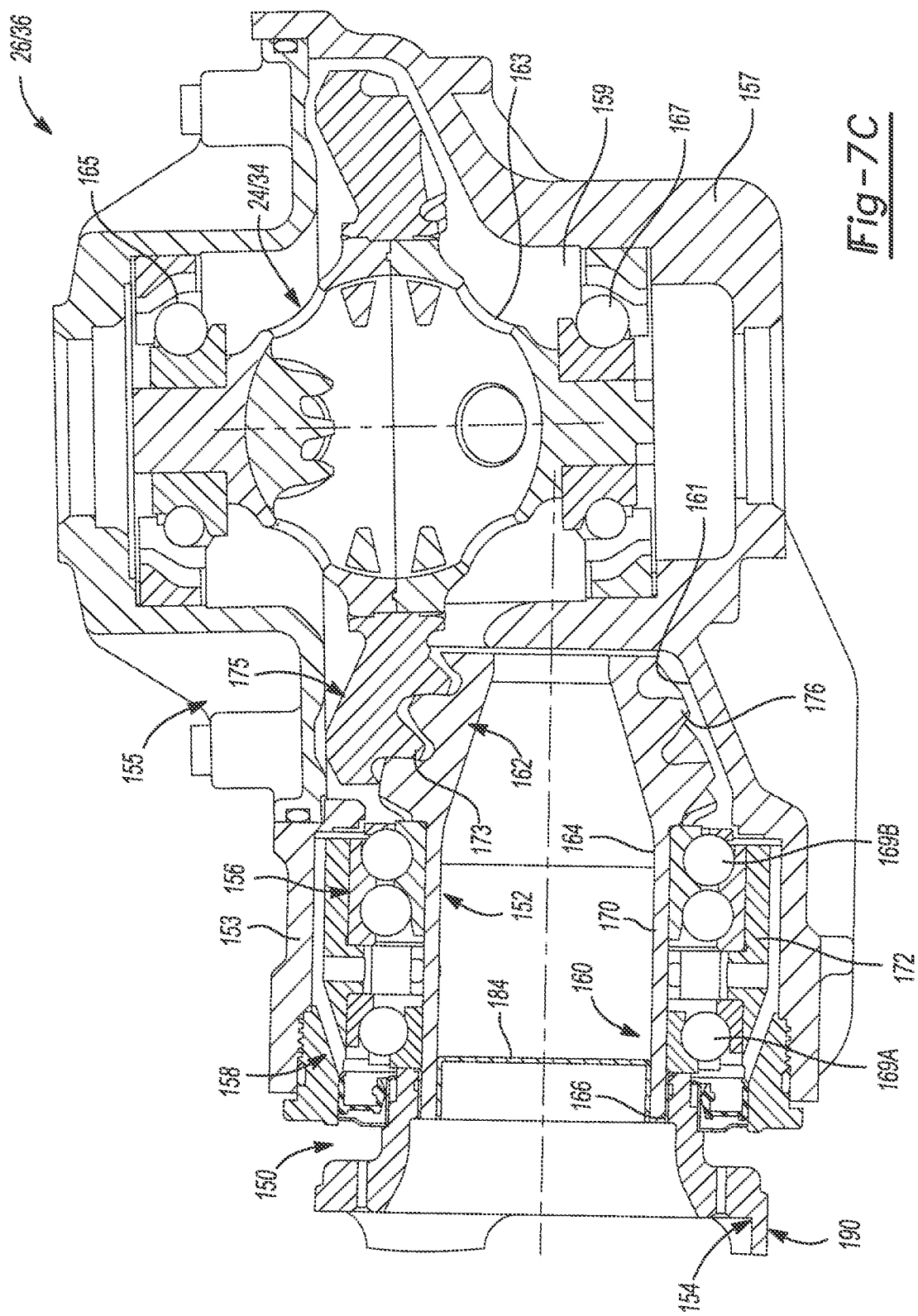
FIG. 7C is a sectional view of a drive axle assembly equipped with the PBC assembly.
Figure 8:
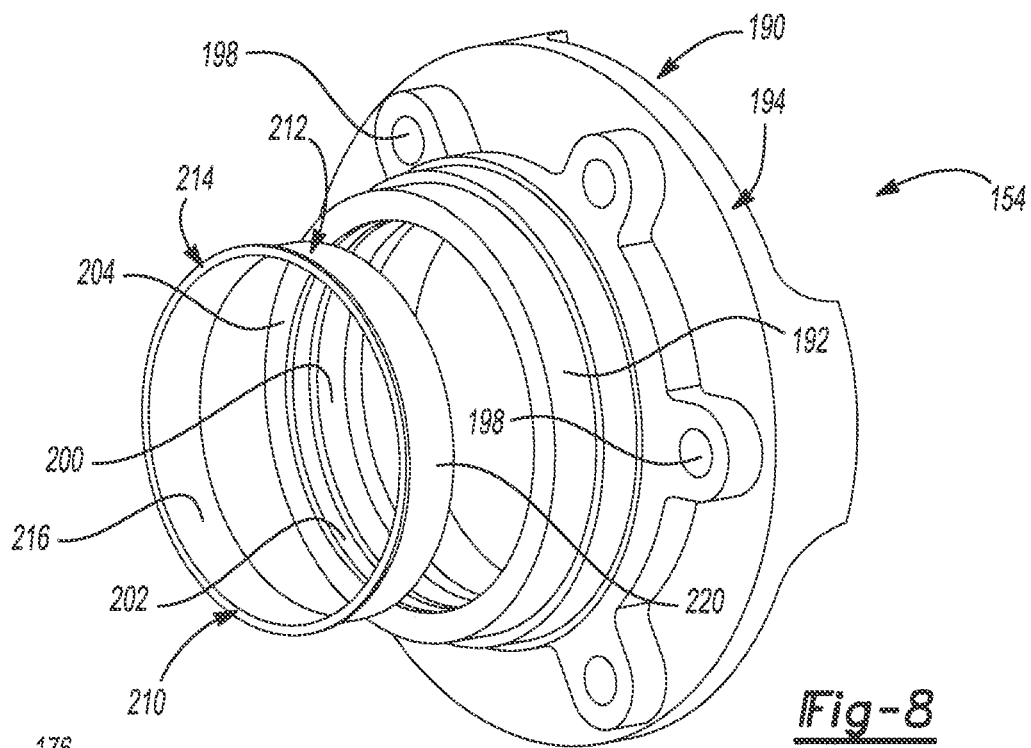
FIG. 8 is an exploded isometric view showing an intermediate sleeve and an aluminum flange plate associated with a mounting system for the PBC assembly shown in FIG. 7.
Figure 9:
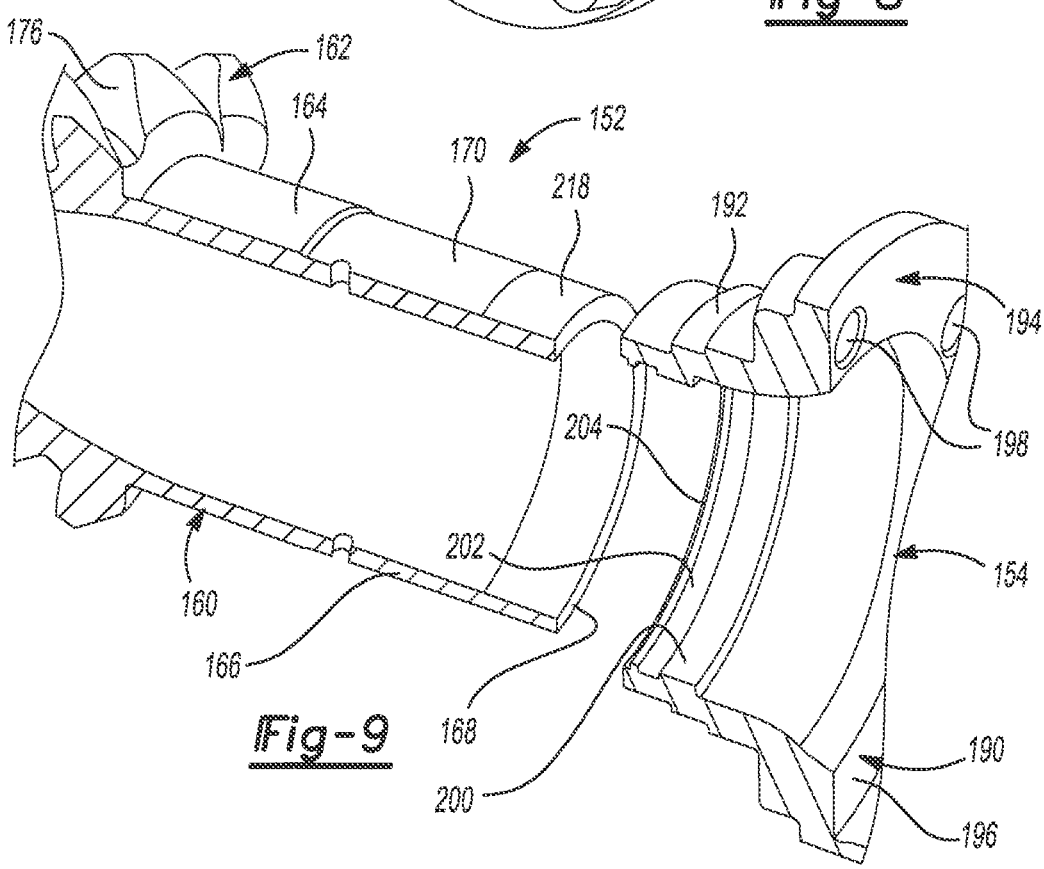
FIG. 9 is an exploded isometric view showing a steel pinion shaft and the aluminum flange plate for the mounting system associated with the PBC assembly shown in FIG. 7.

Referring now to FIGS. 7 through 9, an integrated pinion/bearing/coupling arrangement, hereinafter referred to as a PBC assembly 150, is shown to generally include a pinion unit 152, a coupler unit 154, a bearing unit 156, and a threaded lock collar unit 158. Pinion unit 152 is configured as a hollow steel component (preferably forged) having a tubular pinion shaft segment 160 and a tubular pinion gear segment 162. While shaft segment 160 and gear segment 162 are shown to be integrally formed as a homogeneous steel component, it will be understood that pinion gear segment 162 can alternatively be a separate hollow component (made of different material) that is rigidly secured to a first end of pinion shaft segment 160. Shaft segment 160 has a first end portion 164 from which gear segment 162 extends and a second end portion 166 having an end surface 168. Bearing unit 156 includes a pair of laterally-spaced bearing assemblies 169A, 169B that are operably installed between an intermediate portion 170 of pinion shaft segment 160 and a bearing housing 172 configured to be installed in a pinion housing portion 153 of an axle housing 155. Bearing housing 172 functions to axially position bearing assemblies 169A, 169B. As best seen in FIG. 7B, bearing housing 172 includes a radially-inwardly extending cylindrical lug 173 against which the outer races of bearing assemblies 169A, 169B are engaged. Bearing housing 173 further includes fluid ports 175A, 175B provided to facilitate lubrication supply to the bearings.

Lock collar unit 158 is rigidly secured to bearing housing 172 (or formed integrally therewith) and includes external threads 174 provided to permit the axial positioning of PBC assembly 150 to be adjusted relative to pinion housing portion 153 of axle housing 155 for setting desired preload and/or backlash between gear teeth 176 on gear segment 162 of pinion unit 152 and gear teeth 173 on a ring gear 175. A sealing arrangement includes a seal plate 180 fixed to coupler unit 154 and a flexible rotary seal 182 disposed between seal plate 180 and lock collar 158. A grease cap 184 is shown installed within second end portion 166 of shaft segment 160.

FIG. 7C illustrates a version of one of rear drive axle 26 and front drive axle 36 equipped with PBC assembly 150. As shown, axle housing 155 also includes a differential housing portion 157 defining a differential gearset chamber 159 which communicates with a pinion chamber 161 formed in pinion housing portion 153. Differential assembly 24, 34 includes a differential carrier 163 to which ring gear 175 is rigidly secured (i.e. welded) for common rotation. Carrier 163 is rotatably supported in differential housing portion 157 of axle housing 155 via a pair of laterally-spaced differential bearing assemblies 165, 167. A differential gearset is operably installed within differential gearset chamber 159 of carrier 163 and includes a pair of differential pinions rotatably supported on crosspins that are fixed for rotation with carrier 163. The differential gearset further includes a pair of differential output gears each of which is meshed with both differential pinions. As is conventional, the differential output gears are drivingly connected to axleshafts 23/33. The exemplary drive axles are shown to illustrate a hypoid gearset comprised of pinion gear segment 162 and ring gear 175 and further illustrate the advantages associated with PBC assembly 150 to be described hereinafter.

Coupler unit 154 is shown to include a flange plate 190 having a tubular hub segment 192 and a radial disk segment 194. Disk segment 194 has a planar mounting face surface 196 configured to mate with a corresponding coupling component of a joint unit (i.e. constant velocity joint) or with a mounting flange of a propshaft. A plurality of mounting bores 198 are formed through disk segment 194 and are configured to accept threaded fasteners provided for rigidly connecting coupler unit 154 to the corresponding coupling component, Hub segment 192 defines an inner diameter surface 200 having an annular groove 202 formed therein and an end groove 204. Coupler unit 154 is preferably manufactured from aluminum such as, for example, 6000 or 7000 series aluminum and/or aluminum alloys.

Coupler unit 154 is also shown to include an intermediate sleeve, hereinafter referred to as brazing sleeve 210, having a tubular sleeve segment 212 and a raised end flange segment 214. Sleeve segment 212 is configured to include an inner diameter surface 216 sized to rest on an outer diameter surface 218 of second end portion 166 of pinion shaft segment 160, and an outer diameter surface 220 sized to engage surface 200 of hub segment 192. As best seen in FIG. 7A, raised end flange segment 214 of brazing sleeve 210 is configured to be aligned and retained in end groove 204 of hub segment 192 on flange plate 190. Brazing sleeve 210 is preferably made of a copper or copper/brass alloys or zinc/zinc alloys and is adapted to establish a bonded (i.e. brazed) connection between hub segment 192 of aluminum coupler unit 154 and end portion 166 of steel pinion shaft segment 160. Surface 200 of hub segment 192 can be modified prior to the brazing process to form a layer (i.e. zinc or other coating material) to reduce or eliminate intermetallic layer post welding operation.

The arrangement shown in FIGS. 2 through 9 provides a method and configuration for attaching an aluminum flange to a hollow steel pinion shaft while maintaining a desired pinion bearing preload. Specifically, the use of brazing sleeve 210 fabricated from an intermediary material (copper, copper/bronze alloys, zinc/zinc alloys, etc.) facilitates the laser brazing of an aluminum flange to a steel pinion shaft. Brazing of this joint allows for the accurate setting of the pinion bearing preload with the aluminum flange since large diameter hollow gear segment 162 and shaft segment 160 allows for such a joining process since the shear stress at these larger diameters drive by torque is relatively low. This arrangement may also result in elimination of propshaft flange balancing requirements, simplified assembly, and improved preload accuracy with welded/brazed pinion for increased efficiency.

The hollow pinion design was developed specifically to optimize the overall weight of the axle assembly. Traditional axle pinions typically consist of a gear portion and solid stem portion which is supported by bearings. Due to the relatively small diameter of the stem portion and therefore the bearings, the bearings need to be spaced axially apart a certain distance to maintain stiffness or need to incorporate an additional bearing at the head (the gear section) of the pinion. This results in an increased length axle housing. In this application, designing a hollow pinion with a large diameter equal to approximately 50% of its overall length improved mass by over 20%. This design maintains the same stiffness while also improving the stresses within the bearing as the number of balls are increased at this larger diameter. This also allows for use of thinner and lighter bearing assemblies. Torque transfer capability thru the hollow pinion is equivalent to a smaller diameter solid stem pinion due to increased polar moment of inertia. This improved cross section allows the wall thickness to be further optimized for maximum weight savings.

Figure 10:
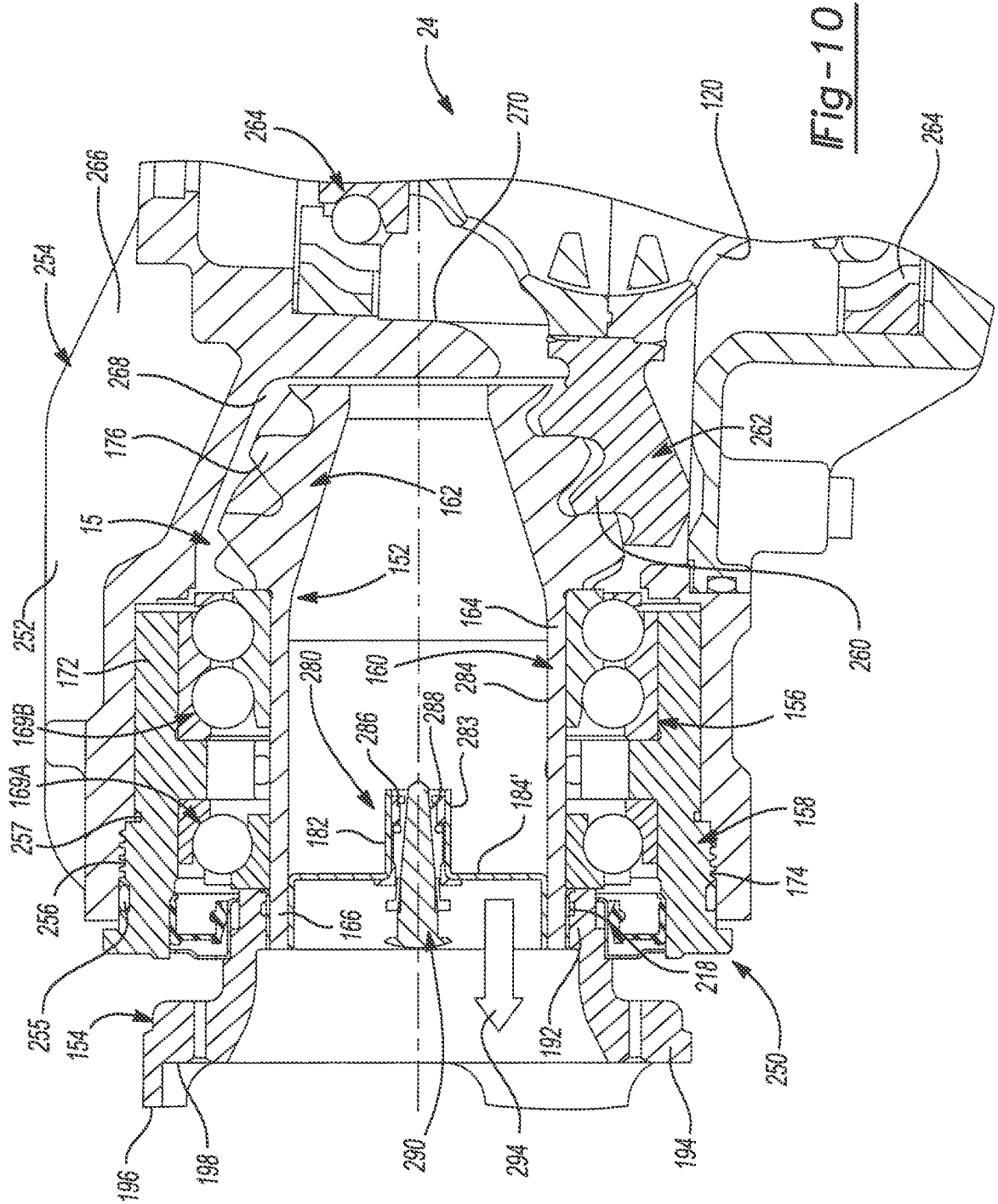
FIG. 10 is a sectional view of an alternative embodiment of a PBC assembly installed in a drive axle assembly and equipped with a venting system arranged to vent air from the differential assembly through the vented PBC assembly.

Referring now to FIG. 10, an alternative version of PBC assembly 150 will be described and hereinafter referred to as "vented" PBC assembly 250. Since vented PBC assembly 250 is generally similar in construction and operation to that of PBC assembly 150, common reference numerals are used to identify those components that are similar to those previously described. In general, vented PBC assembly 250 is adapted to be mounted within a pinion housing portion 252 of an axle housing 254 and includes pinion unit 152, coupler unit 154, bearing unit 156, and threaded lock collar unit 158. Threads 174 on lock collar unit 158 are shown in threaded engagement with internal threads 256 formed in pinion housing portion 252 of axle housing 254. Seal rings 255, 257 are provided between integrated lock collar 158—bearing housing 172 and pinion housing 252. Pinion teeth 176 on gear segment 162 of pinion unit 152 are shown meshed with gear teeth 260 formed on a ring gear 262 which, in turn, is fixed to differential carrier 120 of differential assembly 24. Lateral differential bearing assemblies 264 rotatably support differential carrier 120 on a differential housing portion 266 of axle housing 254. As seen, a pinion chamber 268 formed in pinion housing portion 252 communicates with a differential chamber 270 formed in differential housing portion 266.

Typically, a vent system is provided in association with differential housing portion 266 of axle housing 254 to provide a vent passage between differential chamber 270 and ambient. However, the present disclosure is directed, in this particular embodiment, to a venting system associated with vented PBC assembly 250 to vent air from within differential chamber 270 and/or pinion chamber 268 to atmosphere through a vent assembly 280 that is installed within hollow shaft segment 160 of pinion unit 152. This new and improved venting arrangement permits elimination of conventional differential housing vent systems and provides a sealed arrangement preventing water from being drawn into axle housing 254 upon submerging thereof, thereby meeting OEM "fording" requirements.

With continued referenced to FIG. 10, vent assembly 280 is shown installed in a central aperture 282 formed in a tubular segment 283 of a grease cap 184' mounted to an inner wall surface 284 of second end portion 166 of pinion shaft segment 160. A valve seat ring 286 is installed in central aperture 282 and defines a valve seat opening 288. A spring-loaded plunger 290 is moveable relative to valve seat opening 288 to control the flow of pressurized air from inside hollow pinion unit 152 to atmosphere, as indicated by the arrow 294. Location of vent assembly 280 to within pinion unit 152 of PBC assembly 250 provides additional protection in comparison to conventional housing mounted vents since it is now protected from external damage and fouling.

Referring now to FIGS. 11 through 14, three (3) alternative venting arrangements are shown in association with a combined constant velocity joint (CVJ) and PBC assembly, hereafter referred to as "integrated CVJ/PBC assembly" 300. In general, integrated CVJ/PBC assembly 300 combines one of PBC assemblies 150 and 250 with a joint unit 302. Basically, the coupler unit is replaced with an outer race 304 of joint unit 302 which is rigidly secured to end portion 166 of shaft segment 160. Outer race 304 could be made from aluminum and affixed to steel pinion unit 152 via the brazed sleeve arrangement or, in the alternative, outer race 304 may be a steel component affixed to steel pinion unit 152 via another suitable means. Joint unit 302 further includes an inner race 308 fixed to, or formed integrally with, a plunging-type coupling sleeve 310 having internal spline teeth 312 configured to slidingly and drivingly mate with external spline teeth formed on the propshaft. Balls or rolling elements 314 are located between an annular groove 315 formed in outer race 304 and elongated grooves 317 formed in inner race 308. A cage 316 supports balls 314. As is known, rotation of inner race 308 will cause outer race 304 (and pinion unit 152) to rotate at the same rotational speed, thus allowing a constant speed through joint unit 302 while allowing angular and axial movement of coupling sleeve 310 relative to pinion unit 152. A deflector housing 320 is fixed to outer race 304 and generally surrounds coupling sleeve 310. An extensible rubber/urethane boot 322 has its opposite ends secured to deflector housing 320 and coupling sleeve 310 to accommodate axial and angular movement therebetween while providing a sealed barrier between the environment and joint unit 302.

Figure 11:
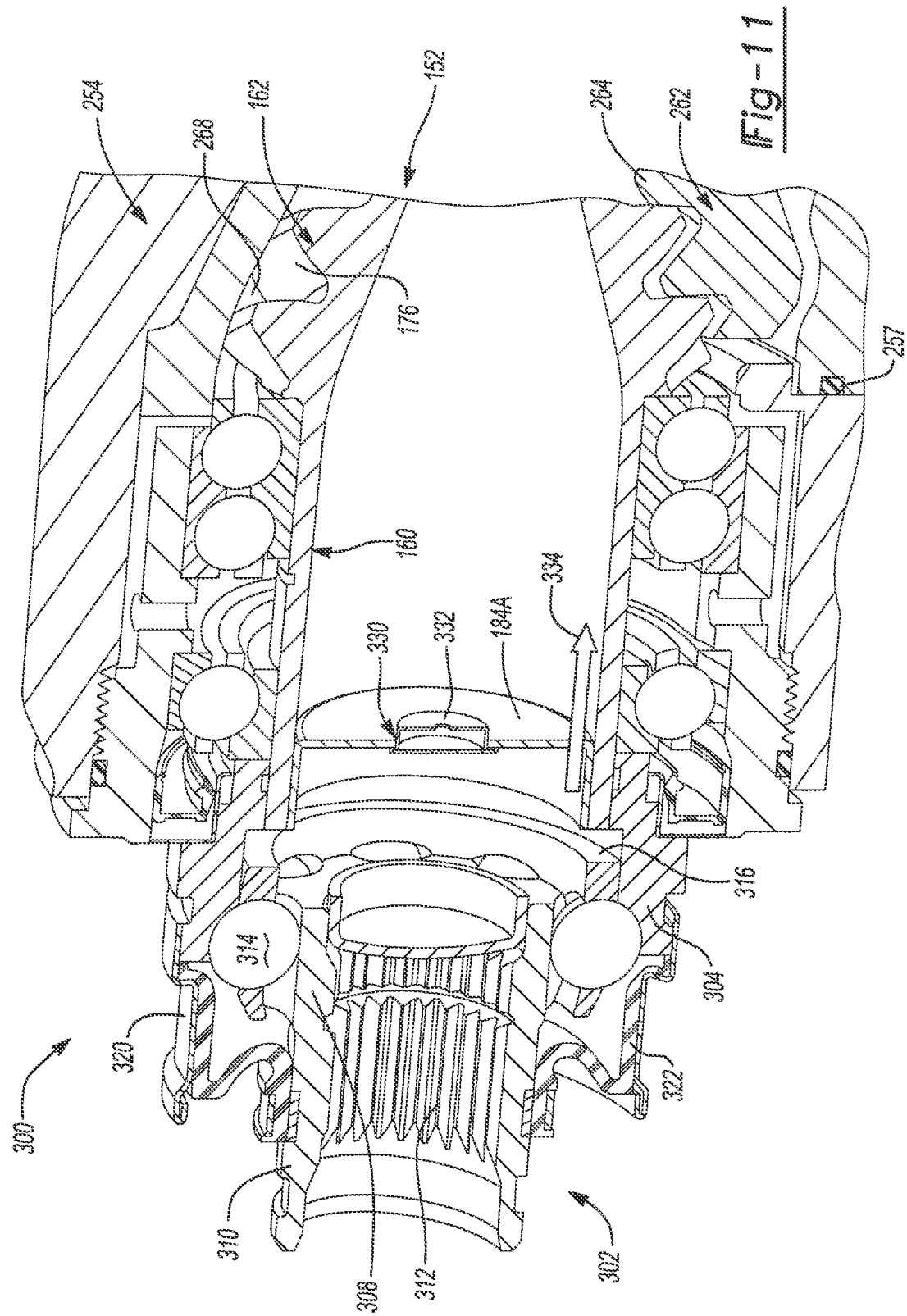
FIG. 11 is a sectional view of another alternative embodiment of a PBC assembly adapted for use with any of the previously-noted power transfer systems and which is constructed in accordance with the teachings of the present disclosure to include an integrated constant velocity universal joint.
Figure 12:
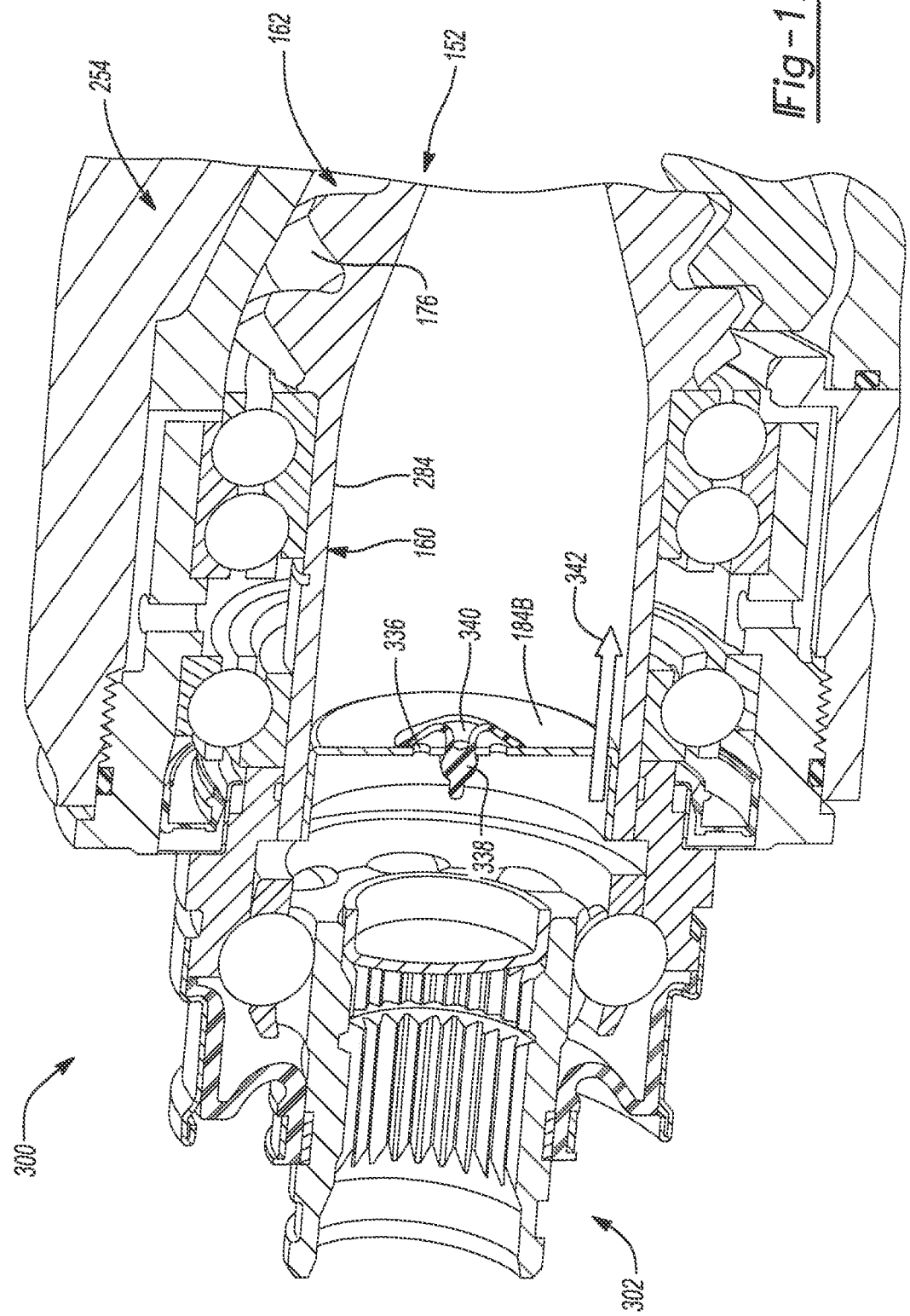

Referring specifically to FIG. 11, the first venting embodiment shows a central aperture 330 formed in grease cap 184A and within which a protected hole baffle unit 332 is installed. Air can be vented, in the direction of arrow 334, from joint unit 302 through hollow pinion unit 152 and be discharged through a venting arrangement within differential housing portion 266 of axle housing 254. Alternatively, FIGS. 12 and 13 show a second venting embodiment wherein a central aperture and a plurality of circumferentially aligned vent holes 336 formed in grease cap 184B. A vent plug 338 is retained in the central aperture of grease cap 184B and has a shroud segment 340 overlying vent holes 336. Air can be vented, in the direction of arrow 342, from joint vent 302 through hollow pinion unit 152 and ultimately be discharged to environment through the vending arrangement in the axle housing. Finally, FIG. 14 illustrates integrated CVJ/PBC assembly 300 installed with grease cap 1640 having a single vent hole 334 to allow joint vent 302 to be vented in the direction of arrow 350.

Depending on the fording requirements of the OEM customer, the vent systems can be located in pinion unit 152 to vent both joint unit 302 and the differential assembly through CVJ flange. Alternatively, joint unit 302 can be vented through the differential assembly for a fully sealed arrangement.

The foregoing description of the embodiments has been provided for purposes of illustration and description. R is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transfer assembly for transmitting drive torque from a powertrain to a pair of wheels in a motor vehicle, comprising:
    a housing;
    a rotary input rotatably supported by the housing and drivingly connected to the powertrain;
    a rotary output rotatably supported by the housing and drivingly connected to the pair of wheels; and
    a hypoid gearset rotatably supported by the housing and operable to transfer drive torque from rotary input to the rotary output, the hypoid gearset including a ring gear and a constant velocity joint (CVJ) unit and a pinion/bearing/coupling (PBC) unit combined to define a CVJ/PBC assembly, the CVJ/PBC assembly being drivingly connected to one of the rotary input and the rotary output, and the ring gear being drivingly connected to the other one of the rotary input and the rotary output, wherein the PBC unit includes a tubular pinion shaft having a hollow pinion shaft segment and a pinion gear segment in meshed engagement with the ring gear, bearings rotatably supporting the hollow pinion shaft for rotation relative to the housing, and wherein the CVJ unit includes an outer race member coupled for rotation with the pinion shaft segment of the pinion shaft, an inner race member connected to the one of the rotary input and the rotary output, and torque transmitting elements disposed between the inner and outer race members;
    wherein the PBC unit further includes a vent assembly installed in the tubular pinion shaft segment of the pinion shaft, and wherein the vent assembly functions to vent pressurized air within the housing to ambient.

2. The power transfer assembly of claim 1, wherein the CVJ/PBC assembly further includes a coupling sleeve disposed between a hub segment of the outer race member and the hollow pinion shaft segment of the pinion shaft.

3. The power transfer assembly of claim 1, wherein the PBC unit further includes a bearing housing supporting a pair of the bearings and which is secured to the housing, and a lock collar configured to secure the bearing housing to the housing.

4. The power transfer assembly of claim 3, wherein the lock collar includes external threads configured to engage internal threads formed in the housing to permit adjustment of the PBC unit relative to the ring gear.

5. The power transfer assembly of claim 1, wherein the rotary input is a propshaft receiving drive torque from the powertrain, wherein the rotary output is a differential assembly drivingly connected to the pair of wheels, and wherein the ring gear is configured to drive the differential assembly.

6. The power transfer assembly of claim 5, wherein the inner race member is configured to be drivingly connected to the propshaft.

7. The power transfer assembly of claim 1, wherein the CVJ unit includes a plurality of outer tracks formed in the outer race member, a plurality of inner tracks formed in the inner race member, a cage having cage apertures, and balls retained in the cage apertures and engaging aligned pairs of the inner and outer tracks.

8. The power transfer assembly of claim 7, wherein the CVJ unit defines a plunging joint unit.

9. The power transfer assembly of claim 1, wherein the pinion shaft is formed as a one-piece steel component.

10. The power transfer assembly of claim 1 defining a drive axle assembly such that the housing is an axle housing, the rotary input is a propshaft drivingly connected to the inner race member of the CVJ unit, and the rotary output is a differential assembly driven by the ring gear.

11. The power transfer assembly of claim 1 defining a power take-off unit such that the housing is a PTU housing, the ring gear is drivingly connected to the rotary input, and the rotary output is a propshaft drivingly connected to the inner race member of the CVJ unit.

12. The power transfer assembly of claim 1, wherein the bearings of the PBC unit include a first bearing assembly and a second bearing assembly each having an inner bearing race fixed to the shaft segment of the pinion shaft, and wherein the inner bearing race of the first bearing assembly is integrated into the outer race member of the CVJ unit.

13. A power transfer assembly for transmitting drive torque from a powertrain to a pair of wheels in a motor vehicle, comprising:
    a housing;
    a rotary input rotatably supported by the housing and drivingly connected to the powertrain;
    a rotary output rotatably supported by the housing and drivingly connected to the pair of wheels; and
    a hypoid gearset rotatably supported by the housing and operable to transfer drive torque from rotary input to the rotary output, the hypoid gearset including a ring gear and a constant velocity joint (CVJ) unit combined with a pinion/bearing/coupling (PBC) unit to define a CVJ/PBC assembly, the CVJ/PBC assembly being drivingly connected to one of the rotary input and the rotary output and the ring gear being drivingly connected to the other one of the rotary input and the rotary output, wherein the PBC unit includes a tubular pinion shaft having a hollow pinion shaft segment and a pinion gear segment in meshed engagement with the ring gear, and bearings rotatably supporting the hollow pinion shaft for rotation relative to the housing, and wherein the CVJ unit is operably disposed between the pinion shaft segment of the pinion shaft and the one of the rotary input and the rotary output;
    wherein the PBC unit further includes a vent assembly installed in the tubular pinion shaft segment of the pinion shaft, and wherein the vent assembly functions to vent pressurized air within the housing to ambient.

14. The power transfer assembly of claim 13, wherein the CVJ unit includes an outer race member fixed for rotation with the pinion shaft segment of the pinion shaft, an inner race member fixed for rotation with the one of the rotary input and the rotary output, and torque transmitting elements disposed between the inner and outer race members.

15. The power transfer assembly of claim 14, wherein the CVJ/PBC assembly further includes a coupling sleeve disposed between a hub segment of the outer race member and the hollow pinion shaft segment of the pinion shaft.

16. The power transfer assembly of claim 13, wherein the PBC unit further includes a lock collar configured to secure the PBC unit to the housing, and wherein the lock collar includes external threads configured to engage internal threads formed in the housing to permit adjustment of the PBC unit relative to the ring gear.

17. The power transfer assembly of claim 13, wherein the rotary input is a propshaft receiving drive torque from the powertrain, wherein the rotary output is a differential assembly drivingly connected to the pair of wheels, and wherein the ring gear is configured to drive the differential assembly.

18. The power transfer assembly of claim 13 defining a drive axle assembly such that the housing is an axle housing, the rotary input is a propshaft drivingly connected to the inner race member of the CVJ unit, and the rotary output is a differential assembly driven by the ring gear.

19. The power transfer assembly of claim 13 defining a power take-off unit such that the housing is a PTU housing, the ring gear is drivingly connected to the rotary input, and the rotary output is a propshaft drivingly connected to the inner race member of the CVJ unit.

* * * * *